US007154955B2

(12) United States Patent
Suwa et al.

(10) Patent No.: US 7,154,955 B2
(45) Date of Patent: Dec. 26, 2006

(54) MULTI-CARRIER TRANSMISSION SYSTEM AND ASSOCIATED METHOD OF REDUCING THE EFFECT OF MULTI-PATH INTERFERENCE

(75) Inventors: Shingo Suwa, Yokosuka (JP); Hiroyuki Atarashi, Yokohama (JP); Sadayuki Abeta, Yokosuka (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 731 days.

(21) Appl. No.: 10/290,210

(22) Filed: Nov. 8, 2002

(65) Prior Publication Data

US 2003/0092404 A1    May 15, 2003

(30) Foreign Application Priority Data

Nov. 9, 2001    (JP)    ............................. 2001-345171

(51) Int. Cl.
*H04L 27/28*    (2006.01)
(52) U.S. Cl. ......................... 375/260; 370/464; 455/59
(58) Field of Classification Search ................ 370/335, 370/340, 342, 441; 375/147, 148
See application file for complete search history.

(56) References Cited

U.S. PATENT DOCUMENTS 5,619,524 A * 4/1997 Ling et al. ................... 375/130
6,157,820 A * 12/2000 Sourour et al. ........... 455/226.2
6,240,099 B1 * 5/2001 Lim et al. .................... 370/441

FOREIGN PATENT DOCUMENTS

WO    WO 01/52468    7/2001

OTHER PUBLICATIONS

Shingo Suwa et al., "Optimum Bandwidth per Sub-carrier of Multicarrier/DS-CDMA for Broadband Packet Wireless Access in Reverse Link," *The 12th IEEE International Symposium on Personal, Indoor and Mobile Radio Communications*, Proceedings vol. 2, San Diego, Sep. 30-Oct. 3, 2001.
H. Atarashi, et al., Vehicular Technology Conference Proceedings, vol. 1 of 3, pp. 420-424, XP-000970653, "Iterative Decision-Directed Path Search and Channel Estimation for Multi-Carrier/DS-CDMA Broadband Packet Wireless Access", May 15, 2000.

* cited by examiner

*Primary Examiner*—Mohammed Ghayour
*Assistant Examiner*—Adolf DSouza
(74) *Attorney, Agent, or Firm*—Oblon, Spivak, McClelland, Maier & Neustadt, P.C.

(57) ABSTRACT

The transmission system of the present invention is designed to transmit a plurality of signals between the transmitter and the receiver using a plurality of carriers and comprises a radio link characteristics estimator 4 configured to estimate the characteristics of a radio link between the transmitter and the receiver and a carrier quantity determination unit 3 configured to determine the number of carriers according to the result of the estimate by the radio link characteristics estimator 4. The radio link characteristics estimator 4 estimates the characteristics according to an interval in delay time of multipath signals and the number of the multipath signals. The carrier quantity determination unit 3 determines fewer carriers when multipath interference is small, and determines more carriers when the multipath interference is great.

13 Claims, 6 Drawing Sheets

MULTI-CARRIER TRANSMISSION SYSTEM AND ASSOCIATED METHOD OF REDUCING THE EFFECT OF MULTI-PATH INTERFERENCE

CROSS REFERENCE TO RELATED APPLICATIONS

This application is based upon and claims the benefit of priority from the prior Japanese Patent Applications No. P200-345171, filed on Nov. 9, 2001; the entire contents of which are incorporated herein by reference.

BACKGROUND OF THE INVENTION

1. Field of the Invention

The present invention relates to a transmission system, transmission method, transmission apparatus, and electronic recording medium having recorded therein a transmission program, which are configured to transmit a plurality of signals using a plurality of carriers between the transmitter and the receiver, for example, a multicarrier/DS-CDMA.

2. Description of the Related Art

The wideband code division multiple access (W-CDMA) and the cdma2000 have been adopted as the method of a radio access for the 3rd generation mobile telecommunications system (IMT-2000). The radio bandwidth per carrier is 5 MHz for the W-CDMA, and is 1.25 MHz for the cdma2000.

In the mobile communication environment, a radio signal transmitted reaches the receiver as a plurality of radio signals (multipath signal) of which each signal has a different propagation delay due to the effect of buildings and over-ground objects, etc. located between the transmitter and the receiver, called "multipath propagation".

With respect to the multipath signal, the direct sequence code division multiple access (DS-CDMA), which is the basis of the W-CDMA and the cdma2000, resolves a plurality of the multipath signals into independent signals and aligns the phase of the independent signals so as to combine them into one composite signal (it is called RAKE reception). As the result of the combining the signals, desired signal power of the radio signal can be increased, namely RAKE time-diversity effect, and the DS-CDMA can therefore improve receiving performance.

Especially, since the W-CDMA has the radio bandwidth of 5 MHz, the minimum time interval for resolving multipath signal is approximately one fourth of the cdma2000 whose radio bandwidth is 1.25 MHz. Therefore, in the W-CDMA, a received signal can be resolved into a larger number of paths and thereby perform the RAKE reception effectively. The results of experimental examination with regard to the improvement of receiving performance, which is achieved by expanding the radio bandwidth with the RAKE time-diversity effect, have been reported in the literature "Further Results on Field Experiments of Coherent Wideband DS-CDMA Mobile Radio (T. Dohi, Y. Okumura, and F. Adachi: IEICE Trans. Commun., Vol. E81-B, No.6, pp. 1239–1247, June, 1998)".

This literature shows the results of a field experiment for transmission of the DS-CDMA radio signal using the radio bandwidth from 1.25 MHz to 10 MHz. In this literature, it has been reported that the Rake reception is possible with a larger number of resolved paths by expanding the radio bandwidth up to 10 MHz. It has also been reported that, as a result of the above, the receiving performance of the radio signal can be improved by the RAKE time-diversity effect.

Further, in the literature "Performance of Rake Reception in Dense Multipath Channels: Implications of Spreading Bandwidth and Selection Diversity Order (M. Z. Win, G. Chrisikos, and N. R. Sollenberger: IEEE JSAC.c vol.18, No.8, pp, 1516–1525, August, 2000)", it has been analyzed that by expanding the radio bandwidth, the number of the multipath path increases and the receiving performance of the radio signal of the DS-CDMA is improved if RAKE reception is performed using these increased multipath signals. Moreover, this literature shows that the RAKE time-diversity effect decreases as the number of multipath increases, and a level of the improvement of the receiving performance achieved by the RAKE time-diversity effect becomes saturated. Incidentally, in this literature, since it has been assumed that a timing of the respective resolved multipath signals is known, consideration to the accuracy of path timing detection have not been given.

However, in an actual environment, in a case where large numbers of the multipath signals are observed due to expansion of the radio bandwidth, a multipath interference (hereinafter referred as MPI) which the respective signals interfere each other at the receiving unit occurs. Due to the MPI, signal power per path decreases and it causes that the accuracy of the path timing detection for respective paths becomes deteriorated. Moreover, the accuracy of channel estimation, which estimates volume of a fluctuation occurred on the radio link based to the detected signal, becomes deteriorated accordingly and it affects the receiving performance of the radio signal at the receiver.

Considering the above situation, in the literature "Experimental Evaluation of Coherent Rake Receiver for Broadband DS-CDMA Mobile Radio (T. Ikeda, K. Okaga, M. Sawahashi, and F. Adachi: IEEE VTC Spring, pp. 1849–1853, 2000)", the evaluation has been made for the receiving performance under the RAKE reception taking into account of the accuracy of the path timing detection as well as the channel estimation by conducting a laboratory experiment for transmission of the DS-CDMA radio signal using a 100 MHz bandwidth. According to the experimental result, it has been stated that in a case where the multipath exists in very large number, a level of the RAKE time-diversity effect tends to get saturated or decreases due to the MPI and the deterioration of the accuracy of the path timing detection as well as the accuracy of the channel estimation.

Accordingly, as for the DS-CDMA transmission, it is considered that an appropriate radio bandwidth can be determined based on the relationship between the improvement of the receiving performance of the radio signal, which is achieved by the RAKE time-diversity effect, and the deterioration of the receiving performance due to increase in the MPI as well as decrease in a signal power per path.

Conventionally, as for considerations to a mobile communications system, approximately several megahertz (MHz) of bandwidth was adopted even at maximum.

However, it has been expected that a transmission rate of more than several tens of Mbps be achieved even in the mobile communications system. It is therefore anticipated that the radio bandwidth to be assigned for the mobile communications system, will be expanded and it is highly possible that several tens to 100 MHz, or more, of radio bandwidth be assigned for the system. In a case where coping with the expansion of the radio bandwidth by using the multicarrier/DS-CDMA as the radio access, there is the problem that the effect on the radio link, specifically the problem that due to the MPI, the receiving performance of the radio signal greatly varies depending on radio bandwidth per carrier, i.e., the number of carriers.

BRIEF SUMMARY OF THE INVENTION

The present invention has been made in view of the above problems, and thus has an object to provide a transmission system, transmission method, transmission apparatus, and electronic recording medium having recorded therein a transmission program which decrease the effect of the MPI, etc. which occur when transmitting a plurality of signals using a plurality of carriers between the transmitter and the receiver to thereby realize the transmission of a high quality of signals.

To attain the above object, the present invention has feature of determining the number of carriers based on the result of estimate of radio link characteristics between a transmitter and a receiver in a case where transmitting a plurality of signals using a plurality of carriers between the transmitter and the receiver.

Incidentally, in the present invention, the characteristics of the radio link are estimated according to differences in delay time of multipath signals and the number of the multipath path signals. In addition, it is preferred that the number of carriers is decreased when the MPI is small, and the number is increased when the MPI is great.

According to the present invention, the RAKE time-diversity effect is effectively gained by implementing an appropriate number of carriers based on the result of estimate of the radio link characteristics, and receiving performance of the radio signal is improved accordingly.

According to the present invention, the plurality of signals is made by converting a serial signal stream to plural signals and spreading the signals. Therefore, the present invention is applicable to DS-CDMA.

According to the present invention, it is preferred that the number of carriers is determined by receiving a spread signal which has been spread by a spreading code, despreading the received signal whose timing is shifted, generating a delay profile based on the despread signals, selecting paths which satisfy a prescribed condition according to the delay profile, and estimating the characteristics of the radio link based on the selected paths.

Thus, in the circumstance where a received radio signal has variation of delay time due to multipath, appropriate spreading and selection of the paths which satisfy the prescribed conditions are achieved. Consequently, the number of carriers can be determined easily and accurately according to the valid paths even in such circumstance.

According to the present invention, the delay profile is generated according to a pilot symbol whose amplitude and phase are known in the transmitter and in the receiver. Thus, estimating the characteristics of the radio link is performed accurately.

According to the present invention, the characteristics of the radio link are estimated on a periodic basis. Thus, this periodic change allows determining the appropriate number of carriers to reflect successive changes of the radio link characteristics and thereby following the changes of the characteristics in a timely manner.

DETAILED DESCRIPTION OF THE INVENTION

[First Embodiment]

Outline of the Transmission Method

Figure 1:
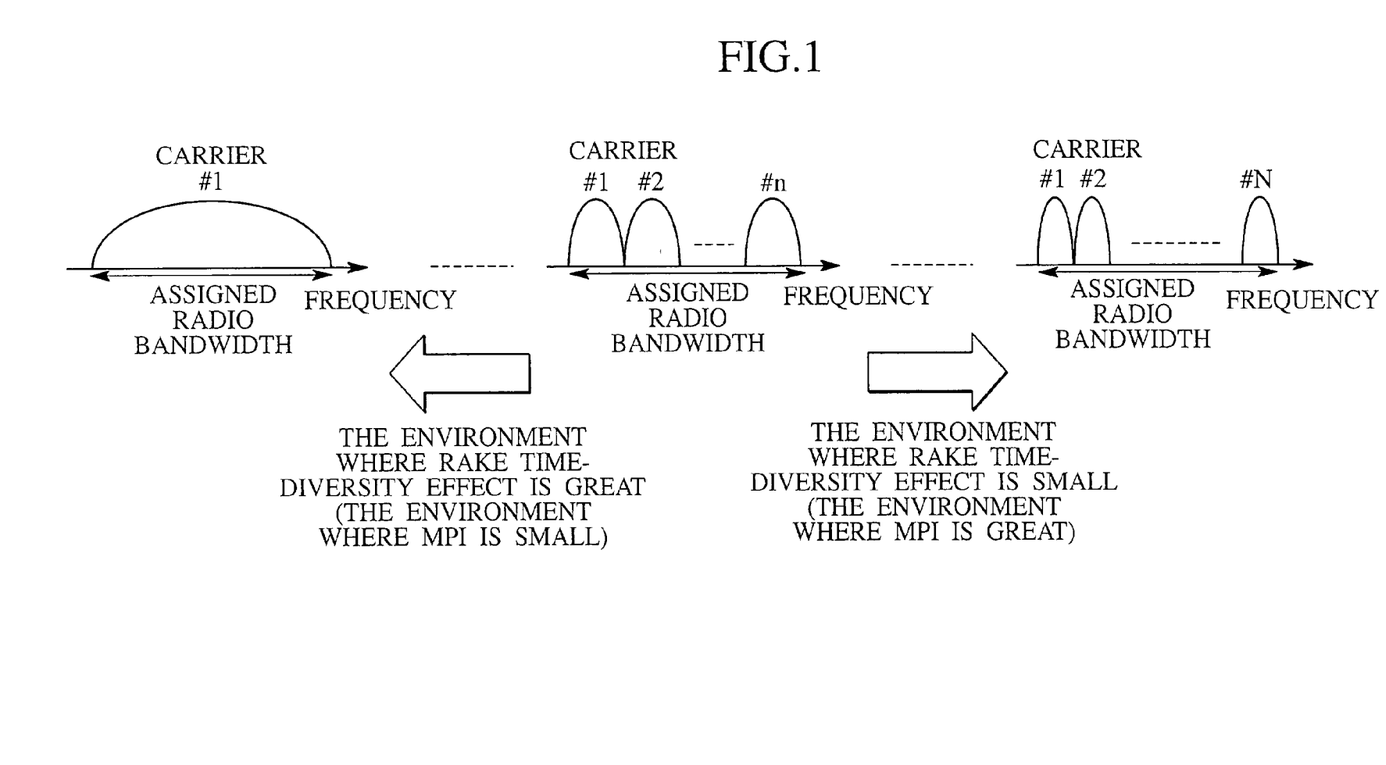
FIG. 1 is a schematic diagram showing a transmission method according to a first embodiment of the present invention.

Hereinafter, an embodiment of the transmission method according to the present invention will be described. FIG. 1 shows the concept of the transmission method according to this embodiment. The frequency spectrums of DS-CDMA signals which are transmitted by an "n" pieces of parallel carriers are shown in FIG. 1.

The transmission method according to this embodiment is applied in a case where transmitting a plurality of signals using a plurality of carriers between the transmitting apparatus and the receiving apparatus, and the number of carriers is determined based on estimation of characteristics of a radio link between the transmitting apparatus and the receiving apparatus. Here, the number of carriers is decreased when the MPI is small and, the number of carriers is increased when the MPI is great.

Specifically, as shown in FIG. 1, the transmitting apparatus performs serial-to-parallel conversion of a serial signal to an "n" (the n is a natural number and it has the range of $1 \leq n \leq N$) pieces of parallel signals using radio bandwidth which is for the radio communications between the transmitting apparatus and the receiving apparatus. Further, the transmitting apparatus spreads the respective signals into a radio bandwidth that is 1/n of the provided radio bandwidth and transmits each signal by a corresponding carrier.

In the DS-CDMA, since a bandwidth per carrier is expanded as the number of carriers (n) becomes decreased, the signal received through the radio link can be resolved into a larger number of multipath signals, and the receiving performance of the radio signal can be improved by combining these signals with alignment of their phases.

Accordingly, in this embodiment, smaller number of "n" is used for the multicarrier/DS-CDMA in the environment where the MPI is small and the accuracy of path timing detection as well as the channel estimation are sufficiently ensured, i.e., the RAKE time-diversity effect is expected.

On the other hand, in the environment where the number of the multipath signals to be resolved is very large, the MPI occurs greatly, and the accuracy of the path timing detection as well as the channel estimation are remarkably degraded, larger number of "n" which results in narrower bandwidth is used for the multicarrier/DS-CDMA.

Transmission System Using Transmission Method

Figure 2:
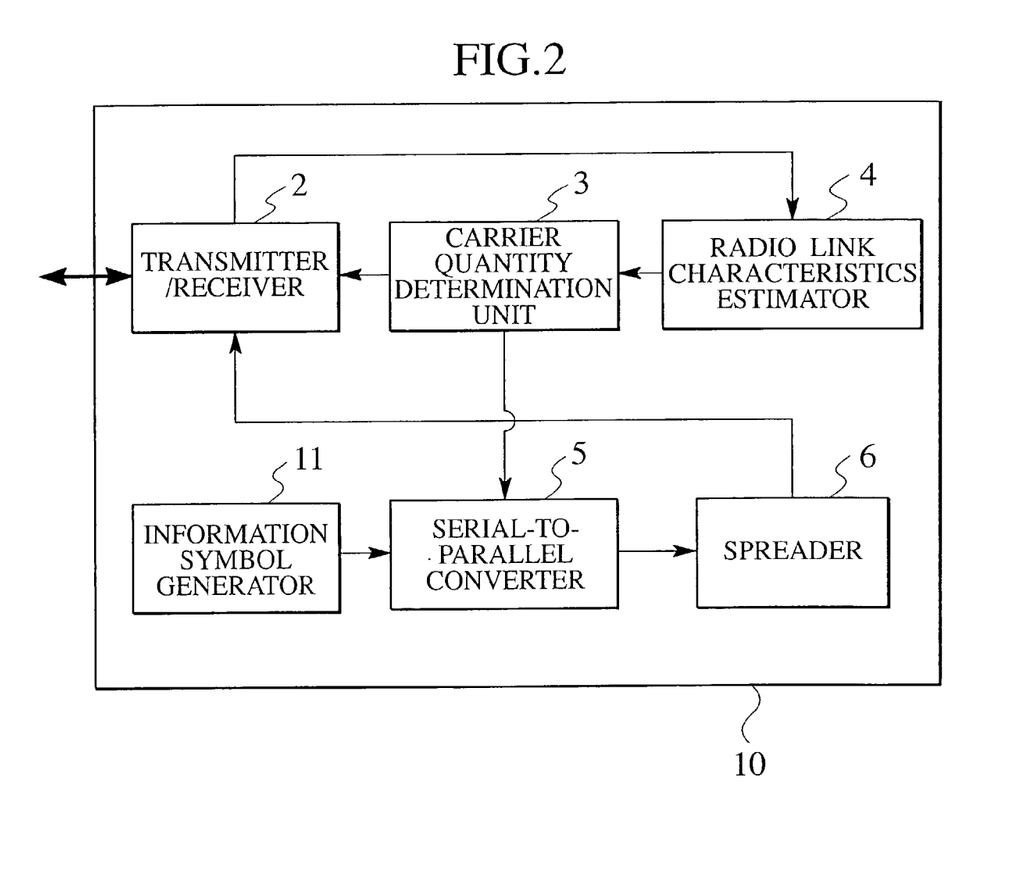
FIG. 2 is a block diagram showing the configuration of a transmitting apparatus in the transmission system according to the first embodiment.

A transmission system for implementing the transmission method according to this embodiment will be described below. FIG. 2 is a block diagram showing the configuration of a transmitting apparatus 10 of this embodiment.

As shown in FIG. 2, the transmitter 10 transmits a plurality of signals using a plurality of carriers between the transmitting apparatus 10 of this embodiment and the receiving apparatus. The transmitting apparatus 10 comprises a transmitter/receiver 2, a carrier quantity determination unit 3, a radio link characteristics estimator 4, a serial-to-parallel converter 5, a spreader 6, and an information symbol generator 11.

The transmitter/receiver 2 is configured to transmit a radio signal between the transmitting apparatus 10 and the receiving apparatus using a radio communications line and transmits an information symbol (payload data) using the number of carriers which is determined by carrier quantity determination unit 3. Further, the transmitter/receiver 2 of this embodiment receives information required for estimating the characteristics of the radio link from the receiving apparatus and forwards the received information to the radio link characteristics estimator 4.

The serial-to-parallel converter 5 is configured to convert a serial signal to a plurality of parallel signals. The serial-to-parallel converter 5 converts a serial signal forwarded by the information symbol generator 11 to plural signals which correspond to the number of carriers determined by the carrier quantity determination unit 3 and forwards the respective converted signals to the spreader 6.

The spreader 6 is configured to spread the plurality of signals. Specifically, the spreader 6 multiplies the converted signal by a prescribed spreading factor and thereby spread the signal into a 1/n radio bandwidth. The spreader 6 then forwards the thus-spread signal to the transmitter/receiver 2.

The radio link characteristics estimator 4 is configured to estimate the characteristics of the radio link (link of the multipath) between the transmitting apparatus and the receiving apparatus. As for method for estimation, method based on time differences between the multipath signals or the number of multipath signals at the receiving side is considered. In this embodiment, the radio link characteristics estimator 4 detects differences in delay time between multipath signals based on information forwarded by transmitter/receiver 2 to thereby estimate the characteristics of the radio link. Incidentally, a delay profile which is to be sent by the receiving apparatus can also be utilized as the information forwarded by the transmitter/receiver 2. The delay profile will be described later.

The carrier quantity determination unit 3 is configured to determine the number of carriers according to the result of the estimation by the radio link characteristics estimator 4. In case where the MPI is small, the carrier quantity determination unit 3 decreases in the number of carriers. On the other hand, in case where the MPI is great, the carrier quantity determination unit 3 increases in the number of carriers. In this embodiment, the information about the number of carriers determined by the carrier quantity determination unit 3 is forwarded to the transmitter/receiver 2 and the serial-to-parallel converter 5. The transmitter/receiver 2 generates carriers according to the information about the number of carriers (the number of signals) which has been forwarded by the carrier quantity determination unit 3, and then transmits the information symbol by using the generated carriers.

Effects and Functions of Transmission Method and Transmission System of the First Embodiment As has been described above, according to the transmission system of this embodiment, it is possible to improve the receiving performance of the radio signal for the multicarrier/DS-CDMA by using the radio bandwidth which is divided by an appropriate number of carriers based on the result of the estimate of the radio link characteristics.

[Second Embodiment]

Configuration of Transmission System

A second embodiment of the present invention will be described below. In the transmission system of the second embodiment, the receiving apparatus receives a spread signal which has been spread by a spreading code, and despreads the received signal whose timing is shifted. The receiving apparatus generates a delay profile based on a result of the despreading process and selects a path satisfying a prescribed condition according to the delay profile. The receiving apparatus then determines the number of carriers according to the path that has been selected.

Figure 3:
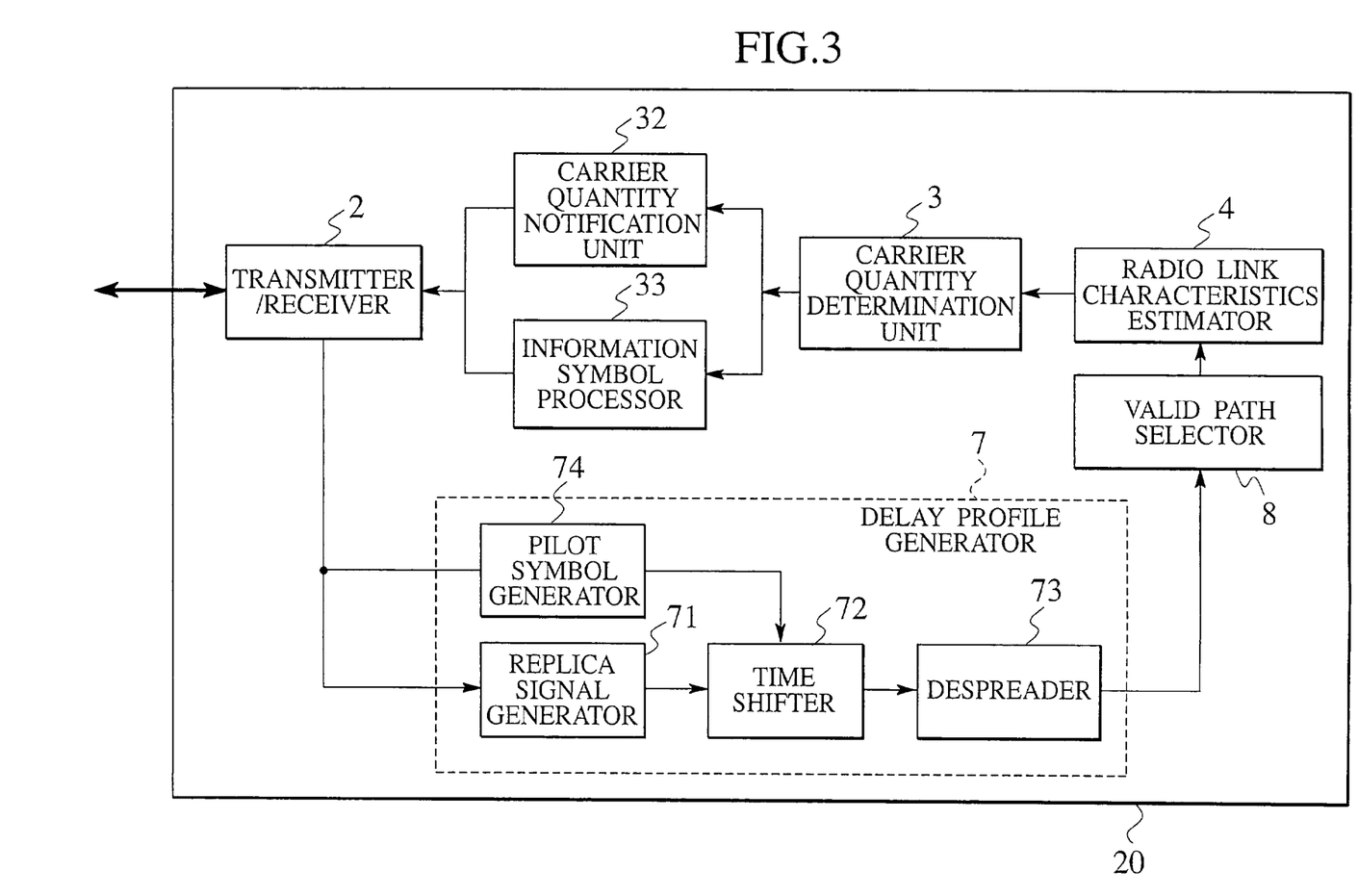
FIG. 3 is a block diagram showing the configuration of a receiving apparatus in the transmission system according to a second embodiment of the present invention.

FIG. 3 is a block diagram showing the configuration of a receiving apparatus 20 for the transmission system of this embodiment. As shown in the figure, the receiving apparatus 20 comprises a transmitter/receiver 2, a carrier quantity determination unit 3, a radio link characteristics estimator 4, a delay profile generator 7, a valid path selector 8, a carrier quantity notification unit 32, and an information symbol processor 33.

The transmitter/receiver 2 is configured to transmit a radio signal between the receiving apparatus 20 and the transmitting apparatus. The transmitter/receiver 2 receives a radio signal which has been transmitted by the transmitting apparatus and forwards the received signal to the delay profile generator 7.

The delay profile generator 7 comprises a replica signal generator 71, a time shifter 72, a despreader 73, and a pilot symbol generator 74.

The replica signal generator 71 is configured to generate and store a replica signal which is a replica of the radio signal received by the transmitter/receiver 2.

The time shifter 72 is configured to shift the timing of the pilot symbol which the spreading code has been multiplied by the pilot symbol generator 74. The time sifter 72 then forwards the shifted signal to the despreader 73. Here, the pilot symbol generator 74 generates a signal, which is known by the receiving apparatus 20 and the transmitting apparatus, multiplied by a spreading code for the pilot symbol and is able to forward the signal to the time shifter 72. It is to be noted that "pilot symbol" means a predetermined monitoring signal between the receiving apparatus 20 and the transmitting apparatus, and the amplitude and the phase of the pilot symbol are known between the receiving apparatus 20 and the transmitting apparatus.

The despreader 73 is configured to perform correlation operation using the received signal which has been generated and stored by the replica signal generator 71 and the signal generated by the pilot symbol generator 74 with timing of the signals are shifted by the time shifter 72 so as to calculate amplitude and phase of the pilot symbol at each timing. Further, the despreader 73 converts the calculated amplitude to a value is of radio power and thereby generates a delay profile. The despreader 73 then forwards the generated delay profile to the valid path selector 8. More specifically, "delay profile" represents the radio power of the respective paths in the multipath signals, in which the replica signal has contained, and relative delay time of the respective paths from the pilot symbol, etc. The delay profile can be generated by despreading the generated replica signal whose timing is shifted.

The valid path selector 8 is configured to select the path which satisfies a prescribed condition according to the delay profile generated by the delay profile generator 7 and forwards the selected path to the radio link characteristics estimator 4 as a valid path. In this embodiment, the valid path selector 8 selects valid paths based on the delay profile if the path has a prescribed received power, or if the relative delay time from the pilot symbol is ranked within a prescribed range. The valid path selector 8 then forwards the result of the selection of valid paths to the radio link characteristics estimator 4.

The radio link characteristics estimator 4 of this embodiment estimates the relative delay time of the respective paths from the pilot symbol. Further, the radio link characteristics estimator 4 can estimate the minimum delay interval based on the relative delay time of the respective valid paths. The radio link characteristics estimator 4 then, forwards the results of the calculations to the carrier quantity determination unit 3.

The carrier quantity determination unit 3 is configured to determine the number of carriers according to the results of the estimate by the radio link characteristics estimator 4. The carrier quantity determination unit 3 determines fewer carriers when the MPI is small and determines more carriers when the MPI is great according to the number of valid paths and the delay interval forwarded by the radio link characteristics estimator 4. In this embodiment, information about the number of carriers determined by the carrier quantity determination unit 3 is forwarded to the carrier quantity notification unit 32, transmitter/receiver 2, and information symbol processor 33.

The carrier quantity notification unit 32 is configured to transmit the information about the number of carriers determined by the carrier quantity determination unit 3 to the transmitting apparatus via the transmitter/receiver 2. The information symbol processor 33 is configured to transmit the information symbol to the transmitting apparatus via the transmitter/receiver 2.

Process of Transmission System

Figure 4:
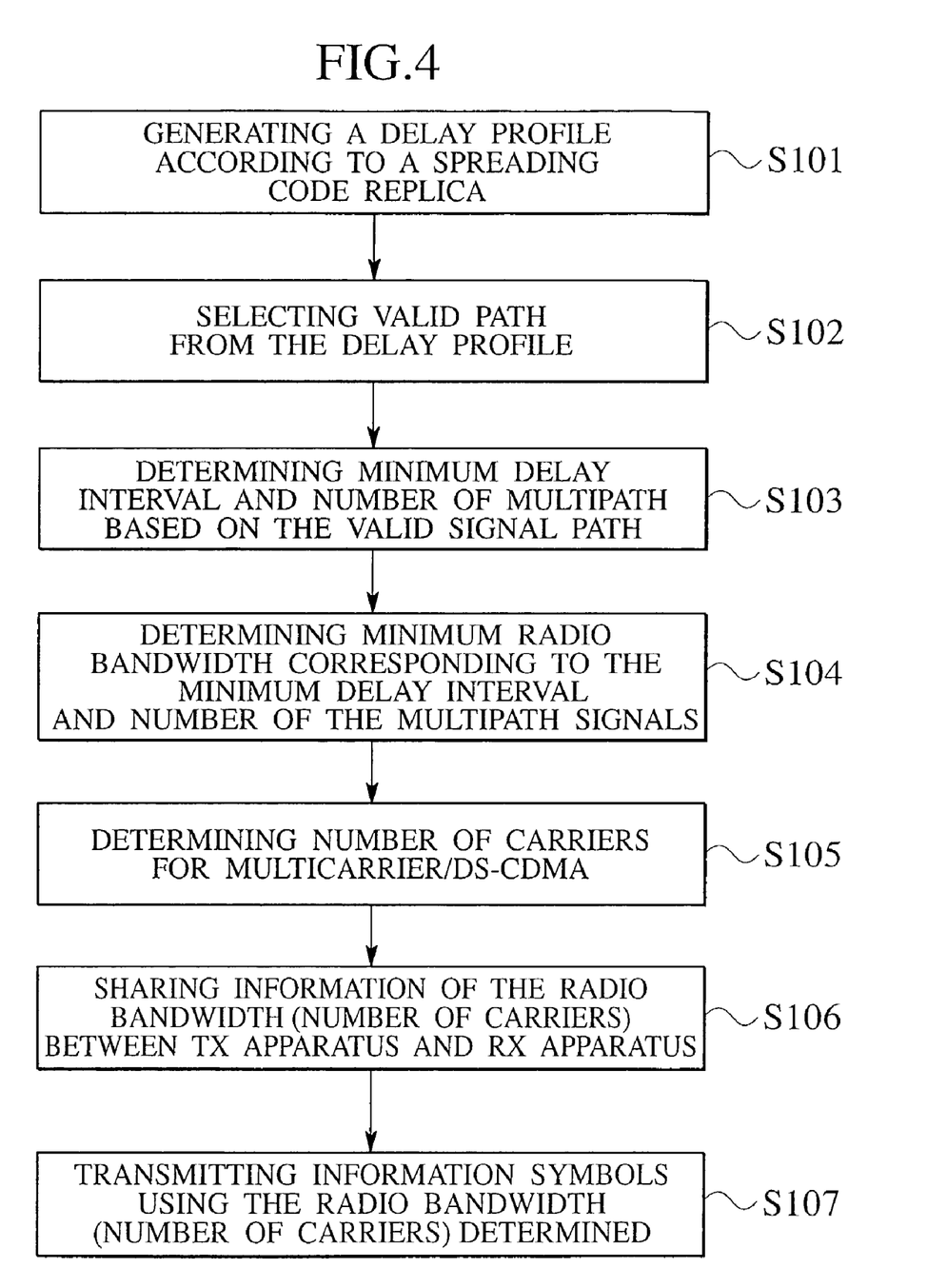
FIG. 4 is a flowchart showing the process of the receiving apparatus in the transmission system according to the second embodiment.

The receiving apparatus 20 of the second embodiment having the above configuration processes the following procedure. FIG. 4 is a flowchart showing the operation of the receiving apparatus 20.

Firstly, the delay profile is generated based on the pilot symbol whose amplitude and phase are known so as to estimate the characteristics of the radio link (S101). Specifically, a replica signal of the spreading code is generated by the replica signal generator 71 and the generated replica signal is forwarded to the time shifter 72. In the time shifter 72, the replica signal is shifted in terms of time according to the pilot symbol forwarded by the pilot symbol generator 74. Further, the despreader 73 de-spreads the replica signal and then lists the information about the signal obtained by the despreading.

Subsequently, valid paths are selected from the generated delay profile (S102). According to these valid paths, the minimum delay interval between the valid paths and the number valid paths are determined (S103). Thereafter, the minimum required bandwidth is determined according to the number of the valid paths determined in step S103 (S104).

Subsequently, the number of carriers is determined (S105) based on the minimum delay interval ($\tau$) between the valid paths and the number of the valid paths (L) For example, the radio bandwidth of the DS-CDMA can be expressed as (1+a)/Tc. Where (Tc) is a chip period of the spreading code and (a) is a factor of a roll-off filter for limiting the bandwidth (the roll-off factor). Here, the minimum delay interval for resolving the multipath equals Tc. In the transmission system of this embodiment using the minimum delay interval ($\tau$) of the valid paths detected from the delay profile, the Tc which satisfies the condition of Tc<$\tau$ is determined. In addition, the bandwidth per-carrier which can be derived by (1+a)/Tc is then determined.

The information about the number of carriers determined in step S105 is notified to the transmitting apparatus from the receiving apparatus to share the information between the transmitting apparatus and the receiving apparatus (S106).

Subsequently, the information symbol is transmitted using the bandwidth (the number of carriers) between the transmitting apparatus and the receiving apparatus (S107).

Effects and Functions of Transmission System of the Second Embodiment

According to this embodiment, in the circumstances where a received radio signal has differences in delay time due to multipath, appropriate spreading and selection of the paths which satisfy the prescribed conditions are achieved. Consequently, the number of carriers can be determined easily and accurately according to the valid paths.

Moreover, since the delay profile is generated based on the pilot symbol whose amplitude and a phase are known in the transmitting apparatus and in the receiving apparatus, the delay profile can be generated according to the pilot symbol shared between the transmitting apparatus and the receiving apparatus and it is possible to estimate the characteristics of the radio link accurately.

[Third Embodiment]

Configuration of Transmission System

Figure 5:
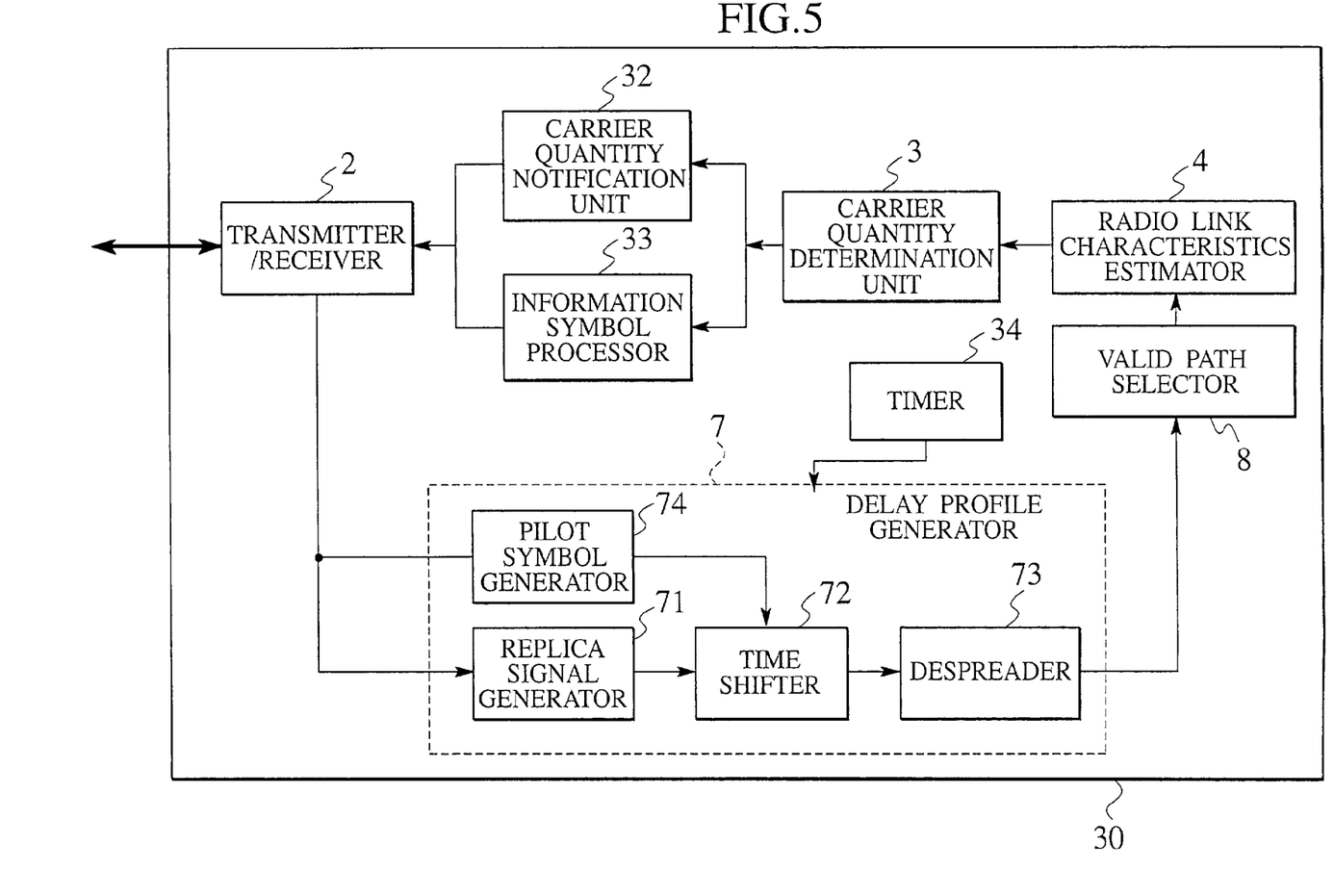
FIG. 5 is a block diagram showing the configuration of a receiving apparatus in the transmission system according to a third embodiment.

A third embodiment of the present invention will be described below. The third embodiment has feature of estimating the characteristics of the radio link, which has been described in the second embodiment, on a periodic basis. FIG. 5 is a block diagram showing a receiving apparatus 30 of the third embodiment.

The receiving apparatus 30 of this embodiment further comprises a timer 34 in addition to the receiving apparatus 20. The timer 34 sends a control signal to the delay profile generator 7 on a periodic basis, and can thereby trigger the delay profile generator 7 to generate a delay profile at certain intervals. The delay profile generated by the delay profile generator 7 is forwarded to the valid path selector 8. Thereby, the characteristics of the radio link are periodically estimated.

Process of Transmission System

Figure 6:
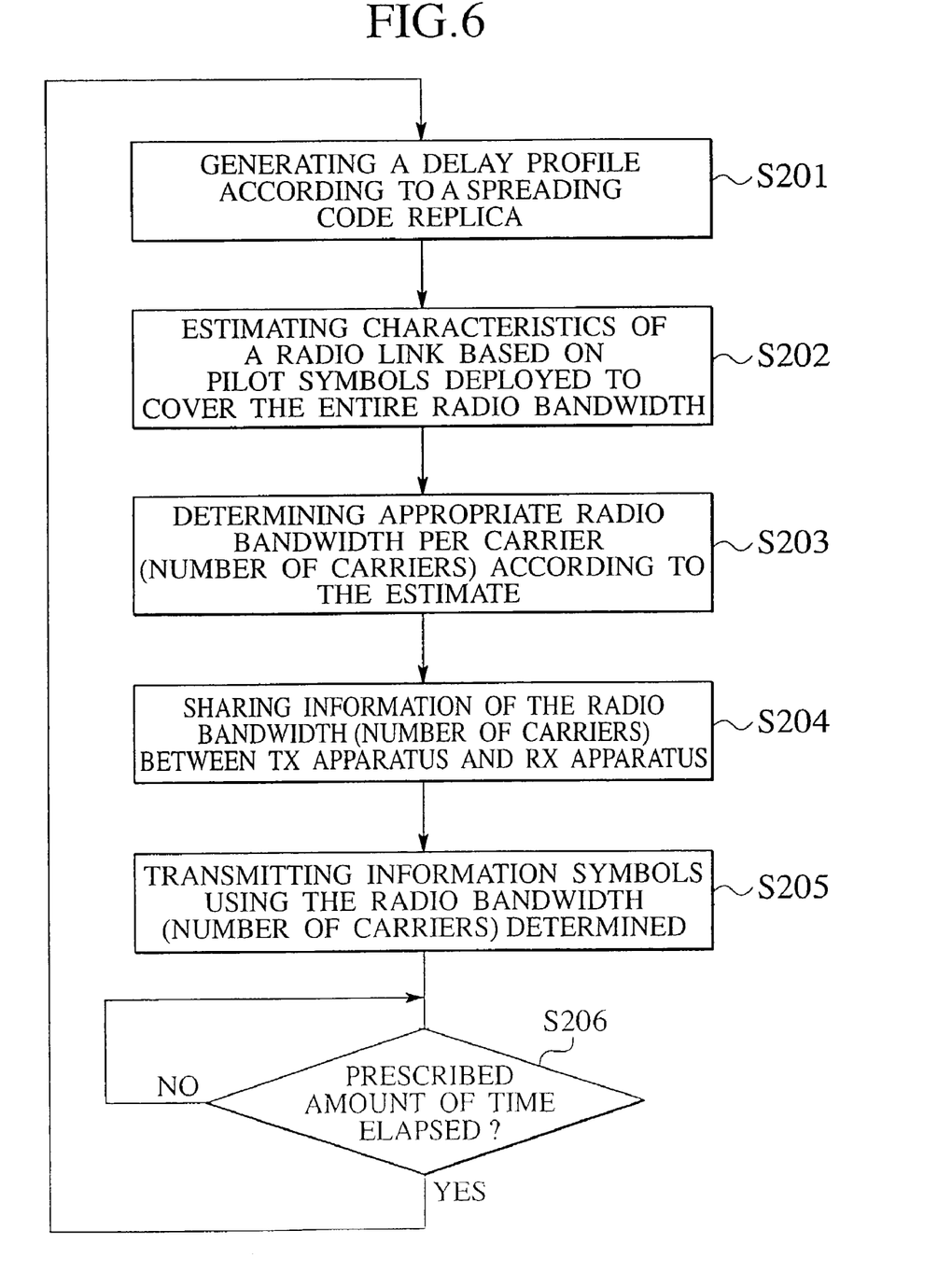
FIG. 6 is a flowchart showing the process of the receiving apparatus in the transmission system according to the third embodiment.

The receiving apparatus 30 which has the above configuration operates according to the following procedure. FIG. 6 is a flowchart showing the operation of the receiving apparatus 30.

Firstly, the delay profile is generated based on the pilot symbols whose amplitude and phase are known so as to estimate the characteristics of the radio link between the transmitting apparatus and the receiving apparatus 30 (S201). In this embodiment, the pilot symbols are to be deployed to cover the assigned bandwidth entirely. The characteristics of the radio link between the transmitting apparatus and the receiving apparatus are then estimated based on information of the pilot symbols contained in the generated delay profile (S202).

Subsequently, an optimum bandwidth per-carrier and the number of carriers are determined from the result of the estimate of radio link characteristics performed in step S202 (S203). Further, information about the number of carriers determined in step S203 is notified from the receiving apparatus 30 to the transmitting apparatus and the information is shared between the receiving apparatus and the transmitting apparatus (S204). Subsequently, the information symbol is transmitted between the transmitting apparatus and the receiving apparatus through the determined radio bandwidth (S205).

Then, in this embodiment, a prescribed amount of time from the number of carriers has been determined is observed (S206). In a case where the prescribed amount of time has already elapsed, the process from the steps S201 to S204 are periodically repeated, thereby the number of carriers is changed depending upon the characteristics of the radio link. The prescribed amount of time is measured by the timer 34.

Effects and Functions of Transmission System of the Third Embodiment

According to the present invention, the characteristics of the radio link are estimated on a periodic basis and the number of carriers is changed accordingly. This periodic change allows determining the appropriate number of carriers to reflect successive changes of the radio link characteristics and thereby following the changes of the characteristics in a timely manner.

As will be seen from the foregoing description, the present invention allows transmitting high quality of signals by decreasing the effects of the MPI, etc. which occur in transmitting a plurality of signals using a plurality of carriers between the transmitting apparatus and the receiving apparatus.

Various modifications will become possible for those skilled in the art after receiving the teachings of the present disclosure without departing from the scope thereof.

What is claimed is:

1. A transmission system for transmitting a plurality of signals between a transmitter and a receiver using a plurality of carriers, comprising:
    a radio link characteristics estimator configured to compute a minimum delay interval $\tau$ of multipath of the carriers, determine a chip period Tc of a spreading code, which is smaller than the minimum delay interval $\tau$, and compute a radio bandwidth assigned to the carriers; and
    a carrier quantity determination unit configured to determine the number of carriers according to the result of the radio bandwidth computed by the radio link characteristics estimator.

2. The transmission system according to claim 1, wherein the the carrier quantity determination unit is configured to decrease the number of signals when a multipath interference of the carriers is small, and increases at least one of the number of the signals when the multipath interference is great.

3. The transmission system according to claim 1, further comprising:
    a serial-to-parallel converter configured to convert a serial$_{13}$signal to the plurality of signals; and
    a spreader configured to spread the plurality of signals.

4. The transmission system according to claim 1, further comprising:
    a receiver configured to receive a signal spread by the spreading code;
    a delay profile generator configured to generate a delay profile by despreading the received signal received by the receiver using the spreading code whose timing is shifted; and
    a valid path selector configured to select a path which satisfies a prescribed condition according to the delay profile, and wherein
    the radio link characteristics estimator is configured to compute the minimum delay interval $\tau$ according to the path selected by the valid path selector.

5. The transmission system according to claim 4, further comprising:
    a pilot symbol generator configured to generate a pilot symbol whose amplitude and phase are known in the transmitter and in the receiver, and wherein
    the delay profile generator is configured to generate the delay profile according to the pilot symbol.

6. The transmission system according to claim 1, wherein the radio link characteristics estimator computes the characteristics of the link on a periodic basis.

7. The electronic recording medium, the electronic recording medium having recorded therein a program which transmits a plurality of signals between a transmitter and a receiver using a plurality of carriers, and causes a computer to determine the radio link characteristics as in claim 6.

8. A transmission method for transmitting a plurality of signals between a transmitter and a receiver using a plurality of carriers, comprising the steps of:
    a first step of computing a minimum delay interval $\tau$ of multipath of the carriers,
    a second step of determining a chip period Tc of a spreading code, which is smaller than the minimum delay interval $\tau$,
    a third step of computing a radio bandwidth assigned to the carrier; and
    a fourth step of determining the number of carriers according to the result of the radio bandwidth computed in the third step.

9. The transmission method according to claim 8, wherein in the fourth step, the number of signals is decreased when a multipath interference of the carriers is small and, at least one of the number of signals is increased when the multipath interference is great.

10. The transmission method according to claim 8, further comprising the steps of:
    a fifth step of converting a serial signal to a plurality of signals; and
    a sixth step of spreading the plurality of signals.

11. The transmission method according to claim 8, further comprising:
    a seventh step of receiving a signal spread by the spreading code;
    an eighth step of generating a delay profile by despreading the signal received in the seventh step using the spreading code whose timing is shifted; and
    a ninth step of selecting a path which satisfies a prescribed condition according to the delay profile, and wherein
    in the first step, the minimum delay interval $\tau$ is determined according to the path selected in the ninth step.

12. The transmission method according to claim 11, wherein in the seventh step, a pilot symbol, whose amplitude and phase are known, is generated and,
    in the eighth step, the delay profile is generated according to the pilot symbol.

13. The transmission method according to claim 8, wherein in the first step, the radio bandwidth is computed on a periodic basis.

* * * * *